UNITED STATES PATENT OFFICE.

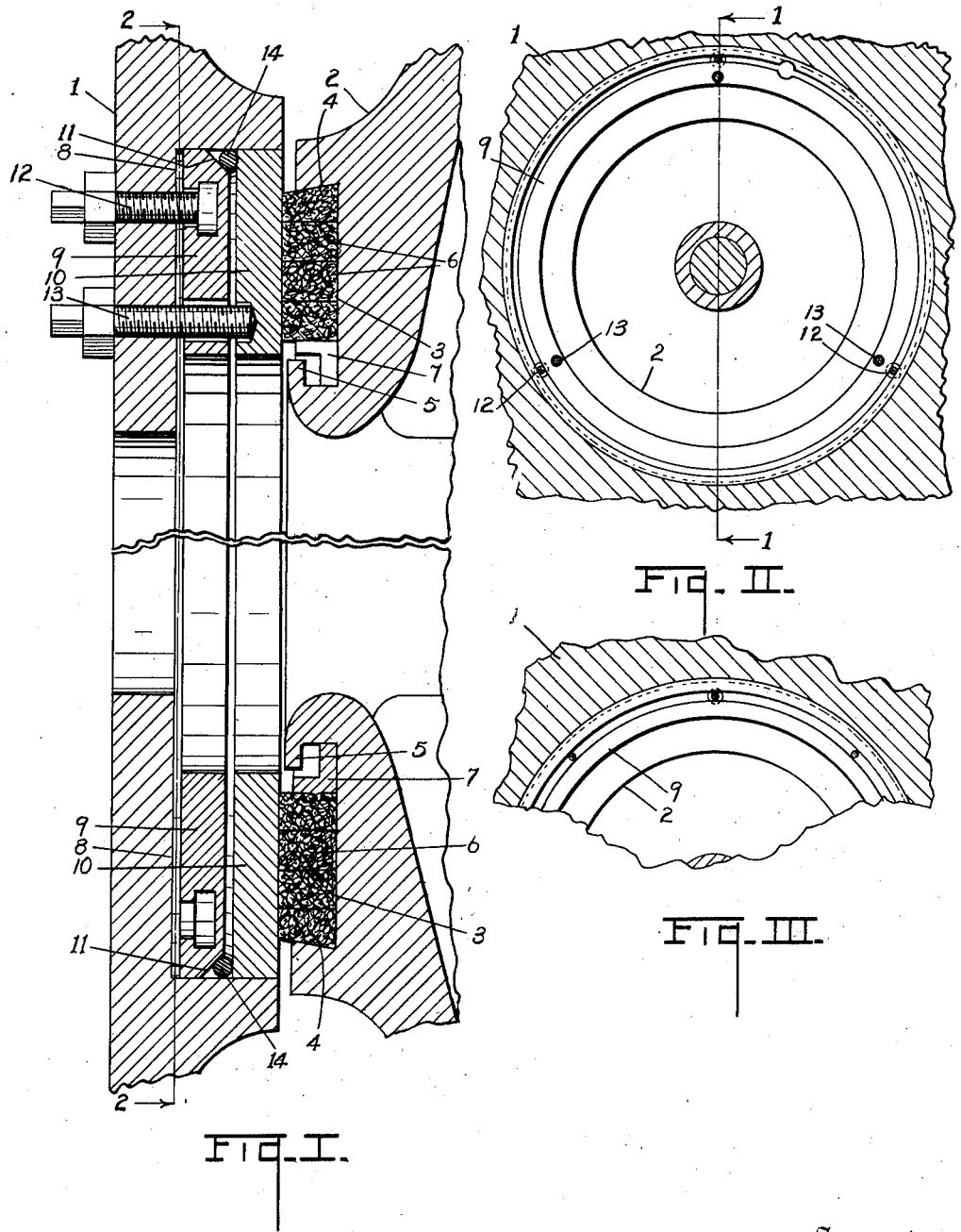

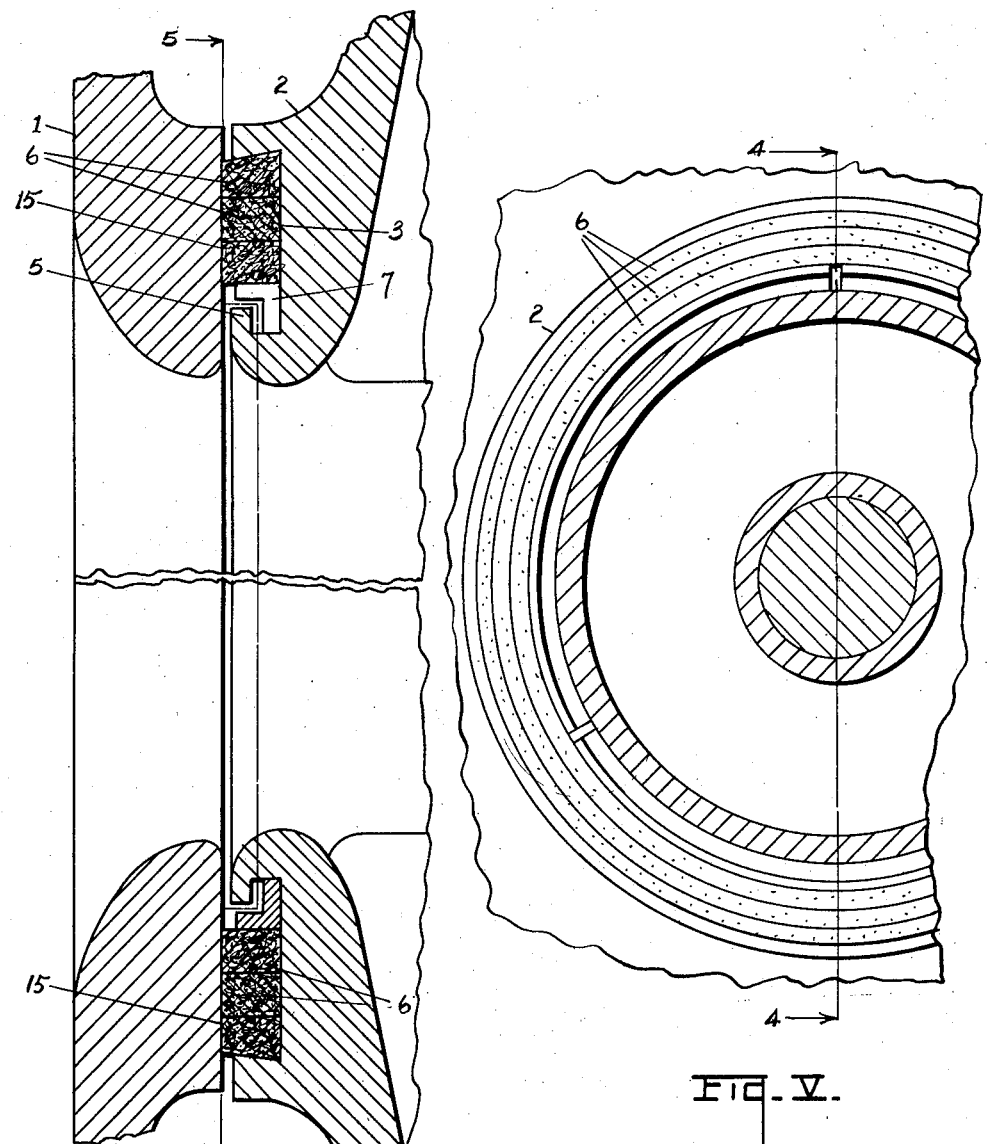

PAUL G. BOGDANOFF, OF BATTLE CREEK, MICHIGAN.

CENTRIFUGAL PUMP.

1,369,380.  Specification of Letters Patent. Patented Feb. 22, 1921.

Application filed January 3, 1920. Serial No. 349,258.

*To all whom it may concern:*

Be it known that I, PAUL G. BOGDANOFF, a citizen of Russia, (who have applied for and taken out first citizenship papers in the United States,) residing at Battle Creek, county of Calhoun, State of Michigan, have invented certain new and useful Improvements in Centrifugal Pumps, of which the following is a specification.

This invention relates to improvements in centrifugal pumps.

The main objects of my invention are:

First, to provide an improved centrifugal pump of high efficiency.

Second, to provide in a centrifugal pump an improved packing means which is effective and may be adjusted to take up wear and which is very durable in structure.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a longitudinal detail section of a centrifugal pump embodying the features of my invention, on a line corresponding to line 1—1 of Fig. II, a portion only of a pump being shown.

Fig. II is a detail transverse section on a line corresponding to line 2—2 of Fig. I.

Fig. III is a detail section corresponding to Fig. II with slightly modified construction.

Fig. IV is a detail longitudinal section of another embodiment or adaptation of my invention taken on a line corresponding to line 4—4 of Fig. V.

Fig. V is a detail transverse section on a line corresponding to line 5—5 of Fig. IV.

In the drawing similar reference characters refer to similar parts throughout the several views, and the sectional views are taken looking in the direction of the little arrows at the ends of the section lines.

Referring to the drawing, 1 represents the casing and 2 the impeller of a centrifugal pump, such portions only being shown as are deemed necessary to illustrate an adaptation or embodiment of my improvements.

The impeller is provided with an end face with an annular channel-like packing seat 3 therein. The outer wall 4 of this packing seat is inwardly inclined, the inner wall is provided with an annular inwardly projecting lip or flange 5. The packing rings 6 of resilient material, such as felt, are disposed in this packing seat to project therefrom.

A follower ring 7 of angle or L cross section is arranged in the packing seat against the inner side of the packing with one arm under the flange 5. This ring is made sectional as indicated in Fig. V for convenience in assembling. The follower serves to support the packing on its inner side.

The casing 1 is provided with a cylindrical recess 8 opposite the packing and in this recess I mount a pair of packing members 9 and 10, the inner packing member 10 constituting a packing face opposed to the packing of the impeller. The packing member 9 has a beveled edge 11 and is adjustably supported by the screws 12. The packing member 10 is adjustably supported by the screws 13.

A gasket 14 is arranged between the packing members and is forced outwardly into contact with the wall of the recess by the beveled edge of the outer clamping member, thereby providing a secure joint at this point.

The packing member 10 being adjustable, desired pressure is provided on the resilient packings and may be adjusted as the packings wear.

My improvements are, however, very practical when embodied as shown in the modifications of Figs. IV and V in which the casing 1 is provided with a flat face 15 opposed to the packing 6 as there is but little wear on these packings.

My improved centrifugal pump is of high efficiency and is very durable. I have not attempted to illustrate or describe certain other modifications or adaptations embodying the features of my invention as I believe the disclosure made will enable those skilled in the art to which my invention relates, to embody or adapt the same as may be desired.

Having thus described my invention, what I claim as new and desire to secure by Letters Patent, is:

1. In a centrifugal pump, the combination of a rotary impeller having a channel-like packing ring seat in the end thereof, the outer wall of said seat being inwardly inclined, the inner wall being provided with outwardly projecting flanges at its edge, a resilient packing disposed in said seat, a follower of L cross section disposed in said seat against the inner side of the packing with one arm under said flange, a casing provided with a cylindrical recess opposite said packing, a pair of annular packing members disposed in said recess, the outer packing member having a beveled outer edge, the inner packing member constituting a packing face opposed to the packing of said impeller, a gasket arranged between said packing members to coact with the beveled edge of the outer member, and adjusting screws for said packing members.

2. In a centrifugal pump, the combination of a rotary impeller having a channel-like packing ring seat in the end thereof, a resilient packing disposed in said seat, a follower disposed in said seat against the inner side of the packing, a casing provided with a cylindrical recess opposite said packing, a pair of annular packing members disposed in said recess, the outer packing member having a beveled outer edge, the inner packing member constituting a packing face opposed to the packing of said impeller, a gasket arranged between said packing members to coact with the beveled edge of the outer member, and adjusting screws for said packing members.

3. In a centrifugal pump, the combination of a rotary impeller having a channel-like packing ring seat in the end thereof, the outer wall of said seat being inwardly inclined, the inner wall being provided with outwardly projecting flanges at its edge, a resilient packing disposed in said seat, a follower of L cross section disposed in said seat against the inner side of the packing with one arm under said flange, a casing provided with a cylindrical recess opposite said packing, a pair of annular packing members disposed in said recess, the inner packing member constituting a packing face opposed to the packing of said impeller, a gasket arranged between said packing members, and adjusting screws for said packing members.

4. In a centrifugal pump, the combination of a rotary impeller having a channel-like packing ring seat in the end thereof, a resilient packing disposed in said seat, a follower disposed in said seat against the inner side of the packing, a casing provided with a cylindrical recess opposite said packing, a pair of annular packing members disposed in said recess, the inner packing member constituting a packing face opposed to the packing of said impeller, a gasket arranged between said packing members, and adjusting screws for said packing members.

5. In a centrifugal pump, the combination of a rotary impeller having a channel-like packing ring seat in the end thereof, the inner wall being provided with outwardly projecting flanges at its edge, a resilient packing disposed in said seat, a follower of L cross section disposed in said seat against the inner side of the packing with one arm under said flange, a casing provided with a cylindrical recess opposite said packing, a packing member disposed in said recess to coact with said packing, and adjusting means for said packing member.

6. In a centrifugal pump, the combination of a rotary impeller having a channel-like packing ring seat in the end thereof, a resilient packing disposed in said seat, a follower disposed in said seat against the inner side of the packing, a casing provided with a cylindrical recess opposite said packing, a packing member disposed in said recess to coact with said packing, and adjusting means for said packing member.

7. In a centrifugal pump, the combination of a rotary impeller having a channel-like packing ring seat in the end thereof, the outer wall of said seat being inwardly inclined, the inner wall being provided with outwardly projecting flanges at its edge, a resilient packing disposed in said seat, a follower of L cross section disposed in said seat against the inner side of the packing with one arm under said flange, and a casing provided with a packing face coacting with said packing.

8. In a centrifugal pump, the combination of a rotary impeller having a channel-like packing ring seat in the end thereof, a resilient packing disposed in said seat, a follower disposed in said seat against the inner side of the packing, and a casing provided with a packing face coacting with said packing.

In witness whereof, I have hereunto set my hand and seal in the presence of two witnesses.

PAUL G. BOGDANOFF. [L. S.]

Witnesses:
 VADA E. MATER,
 EDNA S. MAGUIRE.